United States Patent
Breuer et al.

(10) Patent No.: US 10,912,134 B2
(45) Date of Patent: Feb. 2, 2021

(54) WIRELESS DEVICE-TO-DEVICE COMMUNICATION METHOD

(71) Applicant: Gemalto M2M GmbH, Munich (DE)

(72) Inventors: Volker Breuer, Boetzow (DE); Florian Denzin, Berlin (DE); Uwe Dummann, Panketal (DE); Lars Wehmeier, Falkensee (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 0 days.

(21) Appl. No.: 16/339,029

(22) PCT Filed: Oct. 17, 2017

(86) PCT No.: PCT/EP2017/076433
§ 371 (c)(1),
(2) Date: Apr. 3, 2019

(87) PCT Pub. No.: WO2018/073218
PCT Pub. Date: Apr. 26, 2018

(65) Prior Publication Data
US 2020/0045758 A1    Feb. 6, 2020

(30) Foreign Application Priority Data

Oct. 17, 2016  (EP) .................................. 16194086

(51) Int. Cl.
*H04W 76/14* (2018.01)
*H04W 40/12* (2009.01)

(52) U.S. Cl.
CPC ........... *H04W 76/14* (2018.02); *H04W 40/12* (2013.01)

(58) Field of Classification Search
CPC .............................. H04W 76/14; H04W 40/12
See application file for complete search history.

(56) References Cited

U.S. PATENT DOCUMENTS

2012/0185605 A1*  7/2012  Patil ...................... H04W 76/14
                                                            709/228
2016/0150426 A1*  5/2016  Panaitopol ............ H04L 67/104
                                                            370/252
(Continued)

FOREIGN PATENT DOCUMENTS

WO    2016150525 A1    9/2016
WO    2016162852 A1   10/2016

OTHER PUBLICATIONS

International Search Report (PCT/ISA/210) dated Mar. 19, 2018, by the European Patent Office as the International Searching Authority for International Application No. PCT/EP2017/076433.
(Continued)

*Primary Examiner* — Duc C Ho
(74) *Attorney, Agent, or Firm* — Buchanan Ingersoll & Rooney PC

(57) ABSTRACT

A method for a wireless terminal communicating with a base station of a cellular network, the terminal operating in enhanced coverage mode and configured to set up a communication session with the base station by means of at least one of a direct communication link and a sidelink communication link using a second wireless terminal. The method comprises: determining a quality of the direct communication link with the base station, determining a quality of a communication link to a second wireless terminal capable of communicating with the base station, initiating transmission of a link quality message to the base station, the link quality message comprising information relating to the quality of the communication link, receiving a response from the base station indicating if the direct communication link or the sidelink communication link is to be used, requesting a communication session via the indicated communication link.

16 Claims, 4 Drawing Sheets

(56) References Cited

U.S. PATENT DOCUMENTS

2017/0230441 A1* 8/2017 Van Rensburg .... H04L 65/1083
2018/0098370 A1* 4/2018 Bangolae ............. H04W 76/14

OTHER PUBLICATIONS

Written Opinion (PCT/ISA/237) dated Mar. 19, 2018, by the European Patent Office as the International Searching Authority for International Application No. PCT/EP2017/076433.

* cited by examiner

WIRELESS DEVICE-TO-DEVICE COMMUNICATION METHOD

FIELD OF THE INVENTION

The present invention relates to a method for a wireless terminal for performing communication with a base station. The invention also pertains to a wireless terminal using said method.

The invention further relates to a method for a base station for performing communication with a wireless terminal. The invention also pertains to a base station using said method.

BACKGROUND OF THE INVENTION

In the field of wireless cellular communication there are currently developments ongoing that handle a communication of wireless terminals with base stations of the cellular network, even when the wireless terminals are situated in places with bad coverage conditions. To overcome this issue the concept of enhanced coverage was introduced comprising repeated reception or transmission of information to overcome high coupling loss between transmitter and receiver by accumulation. This concept is operating in uplink and downlink direction.

The drawback of the concept is that the higher the number of repetitions is, the higher is also the power consumption for a given amount of transmitted or received data. For wireless terminals with limited power supply resources here an optimization is necessary. Furthermore the network resource consumption in general is massively increased.

Additionally for coming technology standards also the capability of performing device-to-device communication is introduced, since 3GPP release 12/13. Mainly this capability is dedicated for a direct exchange of data between such wireless terminals, without involving a base station. But the definition of device-to-device communication also includes the so-called sidelink feature, which means a communication from a first wireless terminal to the base station by using a second wireless terminal, wherein the first and the second wireless terminal communicate by means of device-to-device communication methods and the second wireless terminal communicates to the base station by means of common uplink or downlink wireless communication methods. For a wireless terminal operating in enhanced coverage this sidelink path could also be an option and would even open up the possibility to save power resources should the wireless link to the second wireless terminal require less power than the direct path to the base station. The problem to solve is for the wireless terminal to figure out, which path, the direct communication link or the sidelink communication link is advantageous, in particular in terms of power consumption, and from the congestion side of the cellular network.

It is therefore the goal of present invention to find a solution for identifying the best communication link of the wireless terminal with a base station of the cellular network.

Further alternative and advantageous solutions would, accordingly, be desirable in the art.

SUMMARY OF THE INVENTION

For this it is according to a first aspect of the invention suggested a method for a wireless terminal of communicating with a base station according to claim 1. It is further suggested according to a second aspect of the invention a wireless terminal according to claim 7.

According to a third aspect of the invention it is proposed a method for a base station of a cellular network for communicating with a wireless terminal according to claim 11. It is further suggested according to a fourth aspect of the invention a base station according to claim 15.

According to the first aspect of the invention it is proposed a method for a wireless terminal of communicating with a base station of a cellular network, the wireless terminal operating in enhanced coverage mode and configured to set up a communication session with the base station by means of at least one of a direct communication link and a sidelink communication link using a second wireless terminal, the method comprising the steps of:

determining a quality of the direct communication link with the base station, determining a quality of a communication link to the second wireless terminal, the second wireless terminal being capable of communicating with the base station, initiating a transmission of a link quality message to the base station, the link quality message comprising information relating to said quality of the communication link, receiving a response message from the base station indicating if the direct communication link or the sidelink communication link is to be used, requesting for the communication session via the indicated communication link.

Present invention relates to a wireless terminal which is capable of operating with a base station of a cellular network, by means of at least a direct link or a sidelink communication.

The wireless terminal is a stationary or non-stationary device with the capability to communicate wirelessly with at least a base station of a cellular network by means of receiving and transmitting circuitry. The wireless terminal is in particular a machine-to-machine (M2M) or IoT (Internet-of-things) terminal, which allows that it could be operated mainly independently of human interaction.

In at least one mode of operation the wireless terminal is capable of operating in enhanced coverage mode, which comprising repeated reception or transmission of information to overcome high coupling loss between transmitter and receiver by accumulation. The enhanced coverage mode is in particular depicted by an enhanced coverage level, wherein the more repetitions are needed, the higher the enhanced coverage level is set. Preferably the wireless terminal is operating stationary, in a basement of a house, like a metering device, vending machine of a parking garage etc.

The cellular network is a network for wireless communication preferably supporting the technology standard of LTE or beyond, and comprising at least one base station resp. eNodeB supporting at least one of said technology standards.

The at least one base station is the interface of the cellular network to the air interface to wireless terminals, and comprises at least transmitting and receiving circuitry. The base station further is capable of supporting enhanced coverage mode. Preferably a base station has a maximum enhanced coverage level it is ready to carry out.

Further the base station is configured to support communication with a wireless terminal by means of a direct communication link or a sidelink communication link.

Direct communication means the common way of communication between a wireless terminal and the base station over the air interface. This include a communication in normal mode and in enhanced coverage mode.

Sidelink communication means setting up a communication via a second wireless terminal, which then builds up a communication to a base station.

The technology for the first communication link between the wireless terminals is called device-to-device (D2D) and is standardized in 3GPP LTE since Release 12, and was enhanced in Release 13 for relaying communication from one wireless terminal via the second wireless terminal to the base station. This is preferable, as the initial wireless terminal may be out-of-coverage of an appropriate base station, but not the second wireless terminal.

An overview of the actual standardization status on Rel.-13 D2D is described in following documents.

R2-156216 Introducing eSL, by: Samsung Telecommunications, CR 36.331 12.7.0 1936-B, 3GPP TSG-RAN WG2 Meeting #92

R2-156579 Introduction of eD2D, by Ericsson, CR 36.321 12.7.0 0806-B, 3GPP TSG-RAN WG2 Meeting #92

R2-156796 TP to 36.304: Introduction of eD2D, by LG, 3GPP TSG-RAN WG2 #92

Such documents describe the situation that the wireless terminal which wants to setup a communication session is out-of-coverage of a base station. Not resolved is the question, when the wireless terminal is only in the position to set up a communication with a base station in deep enhanced coverage, which results in high number of needed repetitions. This would require high resources in terms of power consumption and network load. It is therefore to decide, when both options of a direct communication link in enhanced coverage and a sidelink communication link are available, if the connection of the wireless terminal to the base station is setup by means of the direct or sidelink communication link.

Here comes the inventive method into play.

According to that—preferably when the wireless terminal is about to set up a communication session—it needs at least once a decision if the direct communication link or the sidelink communication link is selected for establishing said communication session. In order to make the decision, the inventive method is proposed, wherein the wireless terminal carries out the following steps.

As the first method step it is determined the quality of the direct communication link with the base station.

According to a preferred embodiment it is proposed that the quality of communication link relates to at least one of
  enhanced coverage level,
  signal quality,
  power consumption,
  quality of service,
  jamming probability,
  access barring level.

This embodiment in particular means that the communication link between both wireless terminals may also be conducted in enhanced coverage mode. For that both wireless terminals need to support the enhanced coverage mode in the respective enhanced coverage level.

The level of enhanced coverage, resp. the enhanced coverage level is representing the number of repetitions needed for reliably transmitting data packets between base station and wireless terminal or vice versa. For that the wireless terminal evaluates the direct communication link to the base station, and in particular counts at least once the repetitions needed to be able to decode signals from the base station.

Such signals may in particular comprise broadcast signals, e.g. system information. This is preferable as it does not require an additional sample communication which would lead to more congestion.

Additionally, preferably by means of said system information received from the base station, the wireless terminal checks if the base station supports sidelink communication. Preferably the system information fields relating to this sidelink capability are transmitted more frequently than other system information fields. By that wireless terminals operating in enhanced coverage mode have the possibility to be quickly aware of the sidelink capability without too much repetitions.

Additionally the quality of the communication link relates to the signal quality. This involves measures, like RSCP, that are anyhow measured at the wireless terminal for submitting measurement reports to the base station.

The power consumption of the wireless terminal is preferably constantly determined and in particular relates to a given quota from the application part of the wireless terminal. This is in particular relevant in case of a battery powered wireless terminal.

The quality of service is an additional parameter for valuing the previous parameter as it forms a requirement in terms of service availability, assured data rate and/or timeliness. When the signal quality of one communication link indicates a higher likelihood of assuring the expected quality of service, it may be favored even if the power consumption is higher than with the other communication link.

The jamming probability is considered when at least one of the communication links shows indications of being jammed. With known methods such threat can be detected, and consequently handled accordingly.

With the access barring level it is evaluated if the base station indicates, in particular via system information broadcast, that certain wireless terminal, in particular operating in a certain enhanced coverage level may be barred. It is not mandatory that this determination step is carried out directly in conjunction with setting up the envisaged communication session. Instead, in particular for stationary operated wireless terminals, a previous measurement which is not long ago, in particular less time ago than a predetermined time gap.

With the determined number of repetitions the level of enhanced coverage is finally assessed. Preferably the wireless terminal stores the determined level of enhanced coverage and/or the number of repetitions in a memory of the wireless terminal.

In the next step of the inventive method it is proposed that the quality of a potential communication link to a second wireless terminal is evaluated. This holds under the condition that the wireless terminal knows about the second wireless terminals capability to support a communication link via sidelink to base station. Preferably the second wireless terminal indicates such capability. With the direct discovery mechanism foreseen for sidelink communication such capability of the second wireless terminal is preferably detected by way of monitoring discovery messages from the second wireless terminals or requesting by the first wireless terminal (not yet specified). The quality of the communication link is in particular determined from a previous communication session, in particular a D2D session.

After determining the quality of the communication link, it is proposed to initiate a transmission of a link quality message to the base station. The link quality message is supposed to comprise information relating to the quality of the communication link between the wireless terminal and the second wireless terminal.

The message is either provided by the first wireless terminal or the second wireless terminal to the base station. That means that the first wireless terminal sends the link quality message directly to the base station, or alternatively instructs the second wireless terminal to transmit the link quality message. In the latter case sidelink mechanisms are preferably used, but other alternatives are also encompassed by present embodiment.

Further it is preferred to include with the link quality message the results of the determination step relating to the enhanced coverage level. However this is not a mandatory step, as the base station also has means to determine the enhanced coverage level with the wireless terminal.

Further information, in particular relating to the wireless terminal, are preferably submitted with the link quality message.

It is proposed according to another preferred embodiment that the method further comprises the step of receiving a session identifier from the base station and wherein the step of initiating said transmission comprises providing said session identifier for transmission with the link quality message.

According to this embodiment the base station provides the session identifier at some point in time before setting up the communication session. Preferably upon registration resp. camping on the base station, the session identifier is provided.

When the wireless terminal now provides the session identifier, in particular a temporary session identifier, like a TMSI, with the link quality message to the base station, then the base station has means to identify the requesting wireless terminal, even if the link quality message is provided by the second wireless terminal. Further the base station is then in the position to consider additional information relating to the wireless terminal and the resp. direct communication link. This information in particular includes the enhanced coverage level and/or other quality measures relating to the direct communication link.

When the link quality message is transmitted to the base station, the wireless terminal is expecting a response from the base station, comprising an indication if the direct communication link or the sidelink communication link is to be used.

Once this response is received, either direct or indirect via the second wireless terminal, the wireless terminal follows the indication and starts the envisaged communication session by way of the indicated communication link. For doing so the wireless terminal requests at the base station for a communication session by way of the indicated communication link, that is, either directly or via the second wireless terminal.

With that inventive approach it is assured that the optimal communication link is used, considering the situation of the wireless terminal and of the base station. From the outset, none of the involved communication parties, the first wireless terminal, the second wireless terminal and the base station, has a complete overview of the quality of the communication link and/or situation of the base station. Hence none could decide which the best communication link to choose is. Therefore the base station is informed about the communication link between the wireless terminals, once one of them wants to launch a communication session, and the base station makes based on the provided information and its available information about the best communication the decision. This approach is paramount compared to other approaches as it avoids unnecessary signalling, instead the link quality message is only submitted when a communication session is about to be set up.

The base station can for the requested decision further take into account its situation, preferably taking into account data from other cell components. Such information would only with additional efforts be available to another party that could make the decision.

According to another preferred embodiment it is proposed that the second wireless terminal is operating on a different base station than the base station the first wireless terminal is operating on.

This embodiment relates to the situation that the second wireless terminal is camping on a different base station than the first wireless terminal.

The invention also relates to this scenario, which involves that the base station the wireless terminal is camping on and the base station the second wireless terminal is camping on have means to communicate. Preferably another cellular network component, e.g. the Mobile Management Entity (MME), handles such communication, resp. collects information from both affected base stations and takes the decision which communication link is to take by the wireless terminal.

This embodiment is advantageous as it does not restrict the sidelink communication to those situations where the first and second wireless terminal are camping on the same base station.

In another advantageous embodiment it is proposed that in case the response message indicates that direct communication link and sidelink communication link are usable in parallel,
    requesting for a communication session both of the direct communication link and the sidelink communication link.

Provided that the wireless terminal is capable of carrying out a communication session over more than one communication link, then a possible response from the requested base station is an indication to use both communication link, the direct communication link and the sidelink communication link. Such distributed communication may be advantageous in case that both higher data rates are envisaged by the wireless terminal than possible with one of the communication links, or alternatively a higher reliability of the data transmission is requested.

Preferably the parallel communication is carried out staggered by time, meaning at one time transmission is carried out via the one link, at the next time over the other, or in various other time based schemes.

The ability of the wireless terminal is preferably submitted to the base station, either upfront, in particular on registration resp. camping on the base station, or as part of the link quality message.

In a preferred embodiment it is proposed that in case of the wireless terminal operating in a high mobility state the step of initiating a transmission comprises transmitting the link quality message to the second wireless terminal, and the step of receiving comprises receiving the response message from the second wireless terminal comprising an indication of the quality of the communication link between the second wireless terminal and the base station,
the method further comprising the step for the wireless terminal of determining which of the direct communication link or the sidelink communication link is to be used at least based on the determined and received qualities.

With this embodiment it is suggested an alternative solution for finding the appropriate communication link out of the direct communication link and the sidelink communication link. In particular when the wireless terminal is operating in a high mobility state or any other mode accounting for a high volatility of connection quality, it is advantageous to assign the decision making to at least one of the involved wireless terminals. Further in case more than two wireless terminals are connected via sidelink methods, this approach is favorable.

The decision of the wireless terminal may not take into account the congestion situation of the base station. It is therefore suggested to grant to the base station an overruling possibility.

One option for that overruling is an access barring, in particular considering the enhanced coverage level. If the base station detects an overload situation it favors to get rid of connections with high repetition rate. If in such a situation the wireless terminal chose a communication link with rather high enhanced coverage level affecting the base station, then the base station rejects this choice by way of access barring of wireless terminals with a certain enhanced coverage level. If the second communication link provides less enhanced coverage at the base station—but probably higher on the communication link between both wireless terminals—then the wireless terminals are nudged to switch to the communication link with less impact on the base station.

This solution is in particular appropriate for future technology standards like 5G/New Radio, where a more device-centric approach is taken.

According to a second aspect of the invention it is proposed a wireless terminal for operating in a cellular network in enhanced coverage mode with a base station of the cellular network by means of at least one of a direct communication link and a sidelink communication link using a second wireless terminal, for setting up a communication session, the wireless terminal is configured to:
  determine a level of enhanced coverage of the direct communication link with the base station,
  determine a quality of a communication link to the second wireless terminal, the second wireless terminal being capable of communicating with the base station,
  initiate a transmission of a link quality message comprising information relating to said quality of the communication link to the base station,
  receive a response message from the base station indicating if the direct communication link or the sidelink communication link is to be used,
  request for a communication session via the indicated communication link.

The second aspect of the invention shares the advantages of the first aspect. The wireless terminal according to this aspect of the invention comprises in particular a transmitter and receiver circuitry, preferably embedded in one hardware unit, the transceiver circuitry, connected with at least one antenna. With that the wireless terminal carries out the air interface signalling to other entities, like other wireless terminals or base stations.

The wireless terminal further comprises at least one controlling circuitry and at least one memory, in particular volatile memory chips, and additionally permanent memory cards or drives. The controlling circuitry is configured to execute software programs stored in the memory, and with that controls the transceiver circuitry. Such software programs comprise the protocol stack of the supported technology standard.

According to the third aspect of the invention it is proposed a method for a base station of a cellular network for communicating with a wireless terminal, the method comprising upon reception of a link quality message relating to the communication link between a first and a second wireless terminal, the steps of:
  determining a quality of a communication link of the direct communication link to the first wireless terminal and the direct communication link to the second wireless terminal,
  comparing the determined quality of the communication link of the direct communication link to the first wireless terminal with the quality of the communication link of the direct communication link to the second wireless terminal considering the received quality of the communication link relating to the communication link between the first and second wireless terminal according to a sidelink communication link,
  sending a response message indicating the direct or sidelink communication link to the first wireless terminal depending on the result of the comparing step.

This aspect relates to the base station of the cellular network. The cellular network is configured to support at least the technology standard of LTE, and this relates also to the base station. The base station has the capabilities as stated in conjunction with the first aspect of the invention.

The method at the base station starts with the reception of a link quality message received from a wireless terminal camping on the base station. Such link quality message comprises information relating to the signal quality of the communication link between said requesting wireless terminal and second wireless terminal. Such communication link is a D2D communication link, and it is envisaged that either the requesting or the second wireless terminal want to initiate a communication session over a direct communication link to the base station or a sidelink communication link to the base station via the other wireless terminal.

For figuring out which of the both communication link suits best the needs of all involved units, the base station needs to determine in the first step of present inventive method the signal quality of the direct communication link to the first wireless terminal and the second wireless terminal. For simplicity reasons it is assumed that the first wireless terminal initiated the setup of the communication session, and the second wireless terminal transmitted the link quality message. This is not to limit the invention to this scenario, instead also the first wireless terminal could have transmitted the link quality message to the base station.

Preferably during this method step the base station determines the quality of the communication link relating to, enhanced coverage level, signal quality and/or power consumption.

For this determination step the base station preferably measures the communication link between the base station and the wireless terminal.

In conjunction with the measurement of the second wireless terminal, in particular the one initiated the scenario it is proposed that when the link quality message includes a session identifier, the step of comparing comprises contacting another cellular network component with the session identifier, wherein the cellular network component provides an indication relating to the quality of the communication link of the direct communication link to the first wireless terminal.

With that embodiment it is proposed a solution for the situation that the two wireless terminals are camping on different base stations. In that case the base station that receives the link quality message has no way to determine directly the quality of the communication link with the other wireless terminal, as it is not camping on the base station.

Therefore another cellular network component, in particular the MME, is according to this embodiment involved in order to instruct the base station where the other wireless terminal is camping on. To do so the session identifier provided with the link quality message is analyzed in order to figure out which wireless terminal and/or which base station, e.g. with a cell identifier, is involved in the direct communication link to the other wireless terminal.

Preferably the session identifier is only provided in case both wireless terminals are camping on different base stations.

Alternatively the base station is configured to derive from the received session identifier that the wireless terminal is not camping on this base station. This is in particular derived from an indication as part of the session identifier, preferably indicating the base station the wireless terminal is camping on Further it is suggested that the base station has means for identifying the wireless terminal that is initiating the communication session, but is not transmitting the link quality message to the base station.

Therefore the base station has in particular the possibility to measure the signal quality of the direct communication link and or the enhanced coverage level of said communication link.

Eventually the base stations makes the comparison of the direct communication link with the sidelink communication link in order to come to a result of the comparing step. This results preferably comprises an indication which of the two communication link is preferred.

Preferably the comparison of communication link is made based on a comparison of at least one of:
coverage enhancement level,
power situation of the first wireless terminal,
overall network resource consumption,
quality of service requirement,
type of requested service.

This embodiment is advantageous as it does not only take into account the mere signal quality but far more parameter which might be turn out to be critical. With the coverage enhancement level it is related the amount of repetitions, which might affect the load of the base station but also the power consumption of the wireless terminal.

The power situation of the wireless terminal however is additionally affected by the power supply situation. When the wireless terminal is working with a rechargeable battery, and in particular has additionally a predefined power budget per time unit, then this needs also to be considered during the comparing step.

This also applies to the network resource consumption, in particular the traffic load of the base station, and/or at least one other base station of the cellular network or other components. That means, the more network resources are currently allocated, there more each increase of coverage enhancement level is hurting the cellular network.

Additionally a quality of service requirement is considered in order to figure out response times, priority, required reliability etc. The base station consequently can evaluate the both communication links in terms of ability to fulfil such quality of service requirement.

The type of service, e.g. voice call, data session etc. is additionally taken into account for the comparison.

Depending upon the type of parameter needed to be considered for the comparison step, it is also required to provide such parameter to the base station or any other cellular network component contributing to the comparison step. Preferably wireless terminal related parameter are exchanged between wireless terminal and the cellular network upon registration resp. first registration of the wireless terminal in the cellular network. This is in particular true for static parameter, which do not change often. Preferably this is part of the capabilities provided by the wireless terminal.

Alternatively, in particular for those parameter which vary over time, the information are preferably provided with the link quality message to the base station.

According to another preferred embodiment it is proposed that in case the base station provides multiple link capability, the response message indicates that direct and sidelink communication link are usable in parallel. When the base station is capable of conducting communication with a wireless terminal via multiple links, then the base station could—depending on the outcome of the comparison step— also indicate to the requesting wireless terminal to perform the intended communication session over both communication links, the direct communication link and the sidelink communication link.

Preferably the base station needs to consider for such an indication the capabilities of the wireless terminal.

Further it is preferable to indicate such a multiple link communication when the quality of service requirements are very high, but the overall network resource consumption is comparably low.

It shows that the result of the comparison, effectively the decision which of the communication links are to be favored for an intended communication session is best taken in the cellular network, in particular the base station, as here all information relevant for such a decision, come together without remarkable increase in the signalling.

According to the fourth aspect of the invention it is proposed a base station of a cellular network for communicating with a wireless terminal, upon reception of a link quality message relating to the communication link between a first and a second wireless terminal, the base station being configured to:
determine the quality of the communication link of the direct communication link to the first wireless terminal and the direct communication link to the second wireless terminal,
compare the determined quality of the communication link of the direct communication link to the first wireless terminal with the quality of the communication link of the direct communication link to the second wireless terminal considering the received quality of the communication link relating to the communication link between the first and second wireless terminal according to a sidelink communication link,
send a response message indicating the direct or sidelink communication link to the first wireless terminal depending on the result of the comparing step.

The fourth aspect shares the advantages of the third aspect. The base station has the structure described for the first aspect of the invention.

As it is shown this invention advantageously solves the depicted problem and offers a solution which flexibly allows a selection of the appropriate communication link, taking into account all relevant parameter, but without causing too much additional load on the cellular network and the wireless terminals.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a wireless terminal UE1 of the type to which the present invention is applied as an embodiment, and a base station BS as an exemplary embodiment according to the thirds aspect of the invention in interworking operation.

Figure 1:
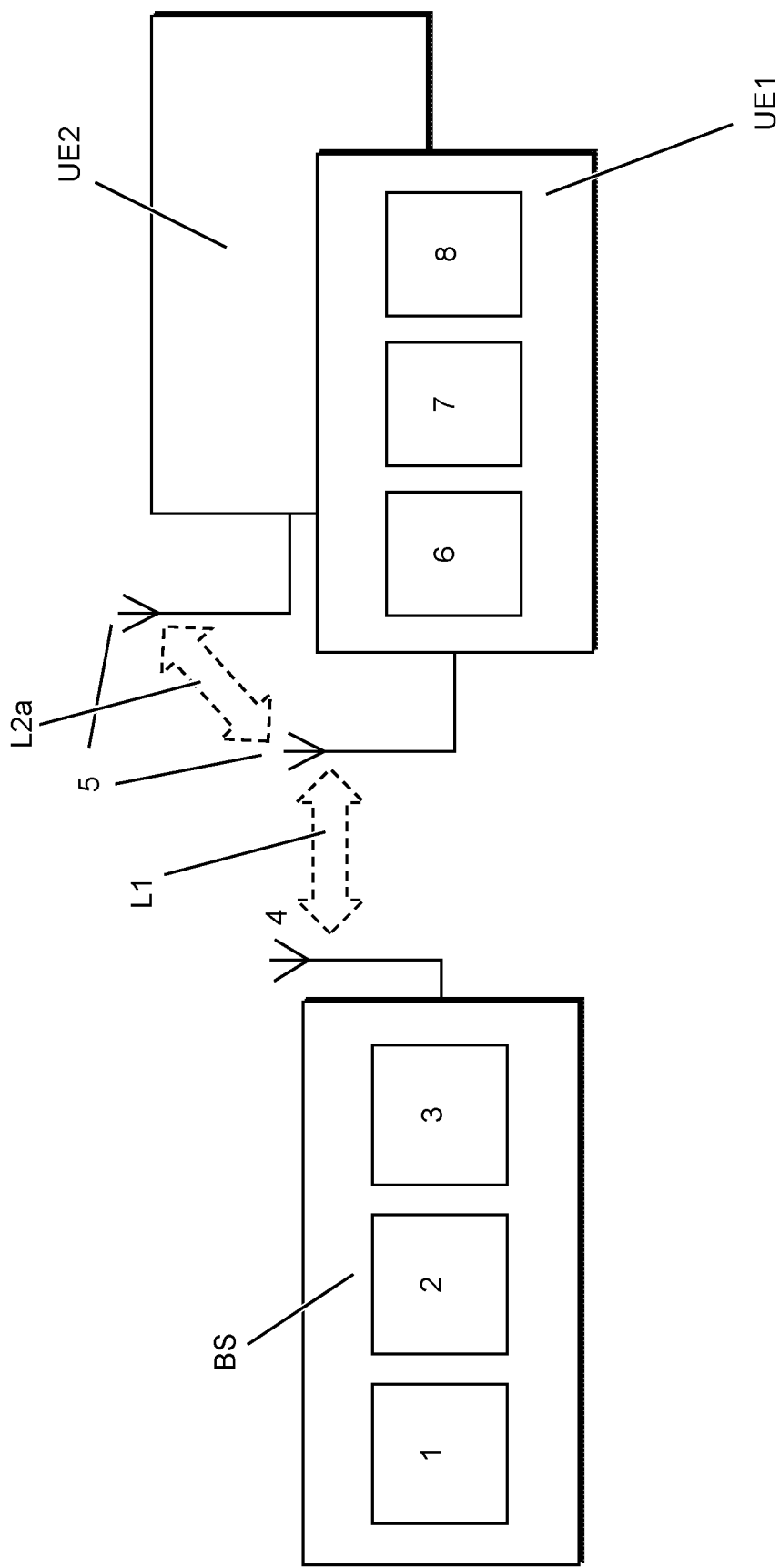
FIG. 1 represents a wireless terminal of the type to which the present invention is applied as an embodiment and a base station of the type to which the present invention is applied as an embodiment.

The base station is part of the cellular network, which comprises a plurality of additional base stations, and interfaces with other radio access components like a MME and core network components like a HSS. The cellular network is a Long Term Evolution (LTE) network, but may additionally support other technology standard, preferable with other base stations.

The base station BS comprises—beside possible other components—a transceiver 3, a controller 2 and a memory 1. Further the transceiver is connected to an antenna 4. The transceiver has the task of communicating over the air interface with a plurality of wireless terminals UE1. It further takes all tasks of scheduling the communication and authenticating wireless terminals which desire to register in the cellular network.

For doing so the transceiver 3 is controlled by the controller 2 which runs software programs stored in memory 1. The memory 1 provides preferably a volatile and a permanent section.

Via the antenna 4 the base station is configured to maintain a direct communication link L1 to a wireless terminal UE1.

The wireless terminal UE1 comprises according to the exemplary embodiment an antenna 5 and at least a transceiver 6, a controlling 7 and a memory 8. Typically, depending upon the purpose of the wireless terminal, other elements like a user interface etc. are available as well. It is further common and encompassed by the invention that the wireless terminal is composed of a controlling entity including memory and a controlling processor, plus a wireless module, which includes the transceiver and additional controlling processor and memory. Typical examples of wireless terminals in the context of the problem solved with present invention are metering terminals which have the task to measure the consumption of electricity, gas etc. and regularly send their stored measurements via the communication unit to a remote service center. In such a case all units are needed for carrying out and manage such measurements.

Additionally another UE2 is shown, which generally comprises the same internal structure. However a different structure is also encompassed by the embodiment. Typically the UE2 provides similar wireless communication components like UE1, in particular the transceiver and antenna. In terms of other terminal components differences are likely. In particular UE2 could be a router, mainly for metering devices. The UE2 has—besides the capability of establishing a direct communication link to a base station—further the capability to set up a device-to-device link L2a.

Typically the device-to-device link L2a is foreseen to exchange data between the wireless terminals UE1 and UE2. According to a preferred embodiment the capability is used for setting up a so-called sidelink communication for communication from one wireless terminal via the second wireless terminal to the base station.

Figure 2:
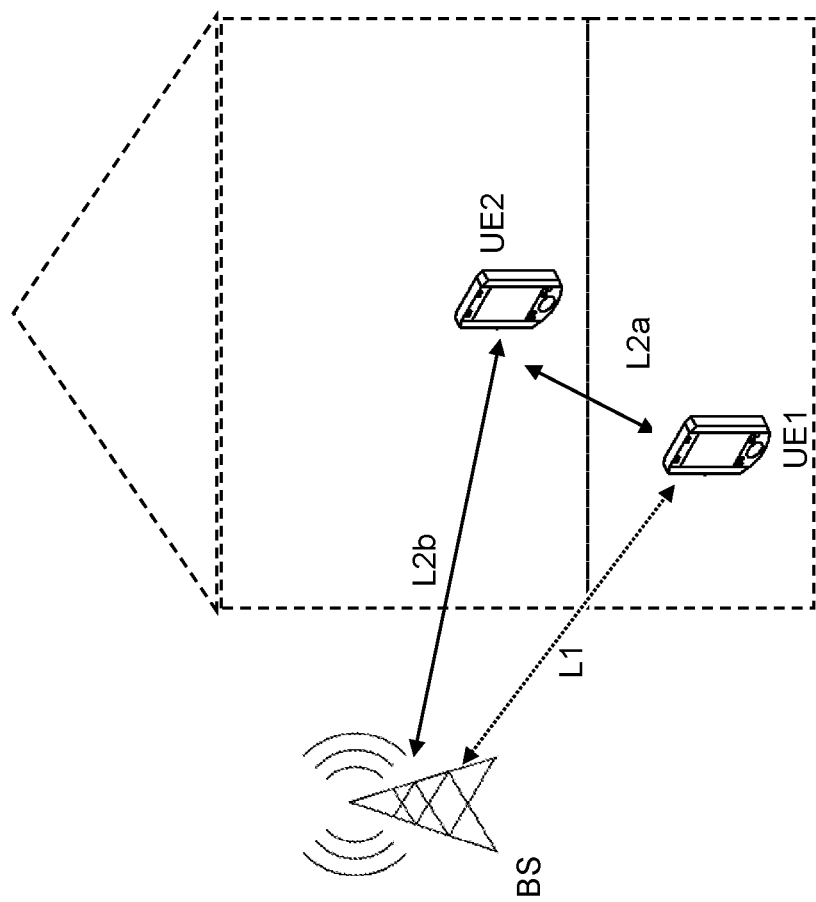
FIG. 2 shows a schematic situation of a wireless terminal and a base station according to preferred embodiment of the invention.

This communication path is shown in detail in FIG. 2. Here a wireless terminal UE1 is situated in the basement of a building. This is preferably exemplarily a metering device. It has a direct communication link L1 with the base station BS. This direct communication link L1 is operated in enhanced coverage mode, due to the bad reception conditions the wireless terminal UE1 is in.

Additionally in a better situation the wireless terminal UE2 is situated. This is in this example a router device. Wireless terminal UE2 is capable of camping on the base station with direct communication link L2b.

Moreover both wireless terminal UE1, UE2 are capable of setting up a device-to-device communication link L2a. In order to do so, the sidelink discovery mechanism is preferably used.

Both communication links involving wireless terminal UE2 could also operate in enhanced coverage.

Wireless terminal UE1 has for setting up a communication session two choices, in particular for transmitting measurement data to a remote server connected to the cellular network where base station BS is part of: The direct communication link L1 or the sidelink communication link L2a-L2b.

Wireless terminal UE1 can make estimations relating to the communication links it is directly involved in, which is L1 and L2a. For the choice about the communication link to the base station, the wireless terminal could compare the link quality of the two communication links, in particular the enhanced coverage level.

In an illustrating example for transmitting over communication link L1 a number of 15 repetitions are needed to reliably transmit the data to the base station. Opposed to that for the communication link L2a to the wireless terminal UE2 only 12 repetitions are needed. From the perspective of the wireless terminal, in particular in terms of power consumption the sidelink communication link would be preferable. But that has not taken into account the repetitions needed by UE2 for sending data over communication link L2b, plus the congestion on the base station. In the case of the need to reach a certain quality of service resp. reliability of data transmission the wireless terminal UE1 has not all information to decide which communication link is to be preferred.

Figure 3:
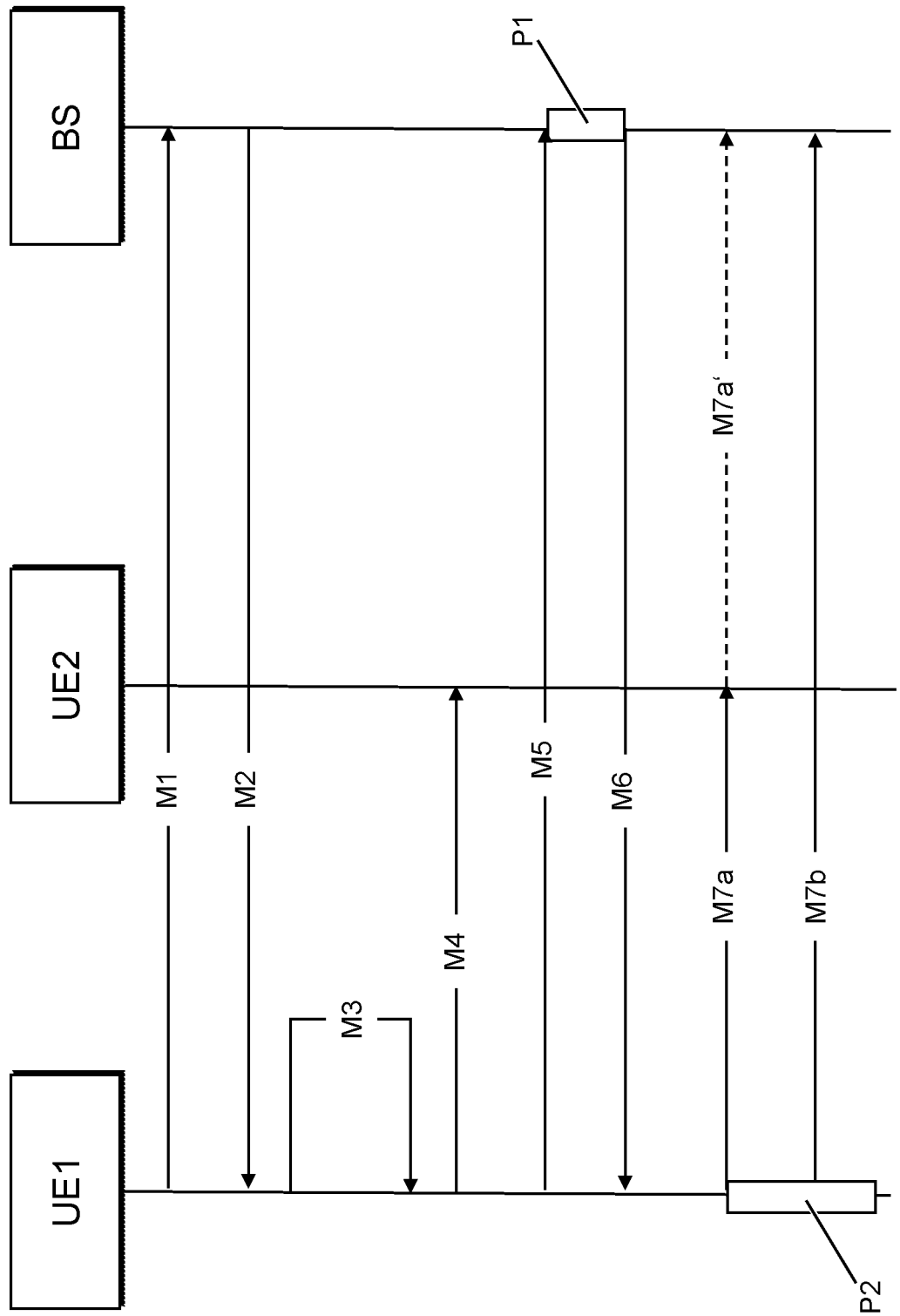
FIG. 3 represents a sequence diagram illustrating a preferred embodiment of present invention.

The procedure according to the inventive method is shown in a preferred exemplifying embodiment in FIG. 3.

In the shown sequence diagram wireless terminals UE1 and UE2 are camping on base station BS. As part of the registration or camping, wireless terminal UE1 requests a session identifier with message M1, in particular a temporary one. The session identifier is in particular the Temporary Mobile Subscriber Identity (TMSI). With message M2 the base station provides said session identifier to the requesting wireless terminal UE1.

For setting up a communication session, the wireless terminal UE1 first evaluates the link quality, in particular the enhanced coverage level of the direct communication link (L1) with message M3.

Then the link quality of the device-to-device communication link L2a is evaluated with measurement M4. For this measurement wireless terminal UE2 may be involved. Preferably prior to this a discovery request is carried out in order to identify UE2 as being capable of supporting sidelink communication.

Then for initiating the communication session, the wireless terminal UE1 sends a link quality message M5 to the base station BS. In the shown embodiment it is the wireless terminal UE1 itself which sends over the direct communication link L1 the link quality message M5. Alternatively wireless terminal UE1 could have sent a message instructing wireless terminal UE2 to send the link quality message M5 to the base station.

Part of the link quality message is at least the outcome of the determination step M4. When sending the session identifier, the base station BS has the possibility to evaluate the link quality of the direct communication link to the wireless terminal UE1 itself. Alternatively the result of determination step M3 is provided with the message as well, as such relieving the base station from additional measurement tasks.

Even in the latter case the session identifier is useful in case the wireless terminal UE2 is camping on another base station than wireless terminal UE1. When base station BS receives the link quality message M5, it starts the process P1 for comparing the communication links to the requesting wireless terminal UE1 and/or UE2. This involves preferably considering additional information, like the congestion situation, power supply situation of the wireless terminal UE1, quality of service requirements etc. For this potentially additional data need to be ascertained.

After doing so and coming to a decision considering all available and/or relevant parameter, the result is transmitted with message M6 to wireless terminal UE1. The result comprises an indication which communication link is supposed to be used by the wireless terminal UE1. A valid answer indicates one of the communication links, but may—in case this is supported by the base station and the wireless terminal UE1—also indicate that both communication link may be used in parallel.

Depending upon the indication comprised in message M6, the wireless terminal UE1 then starts the communication session following the indication. That means that either one of, or both communication link setup messages M7a for sidelink communication link and/or message M7b for direct communication link are sent. The first option is sent to the second wireless terminal UE2 and from there a subsequent communication setup message M7a' is sent to the base station BS. For the second option the communication setup message M7b is directly sent to the base station BS.

Figure 4:
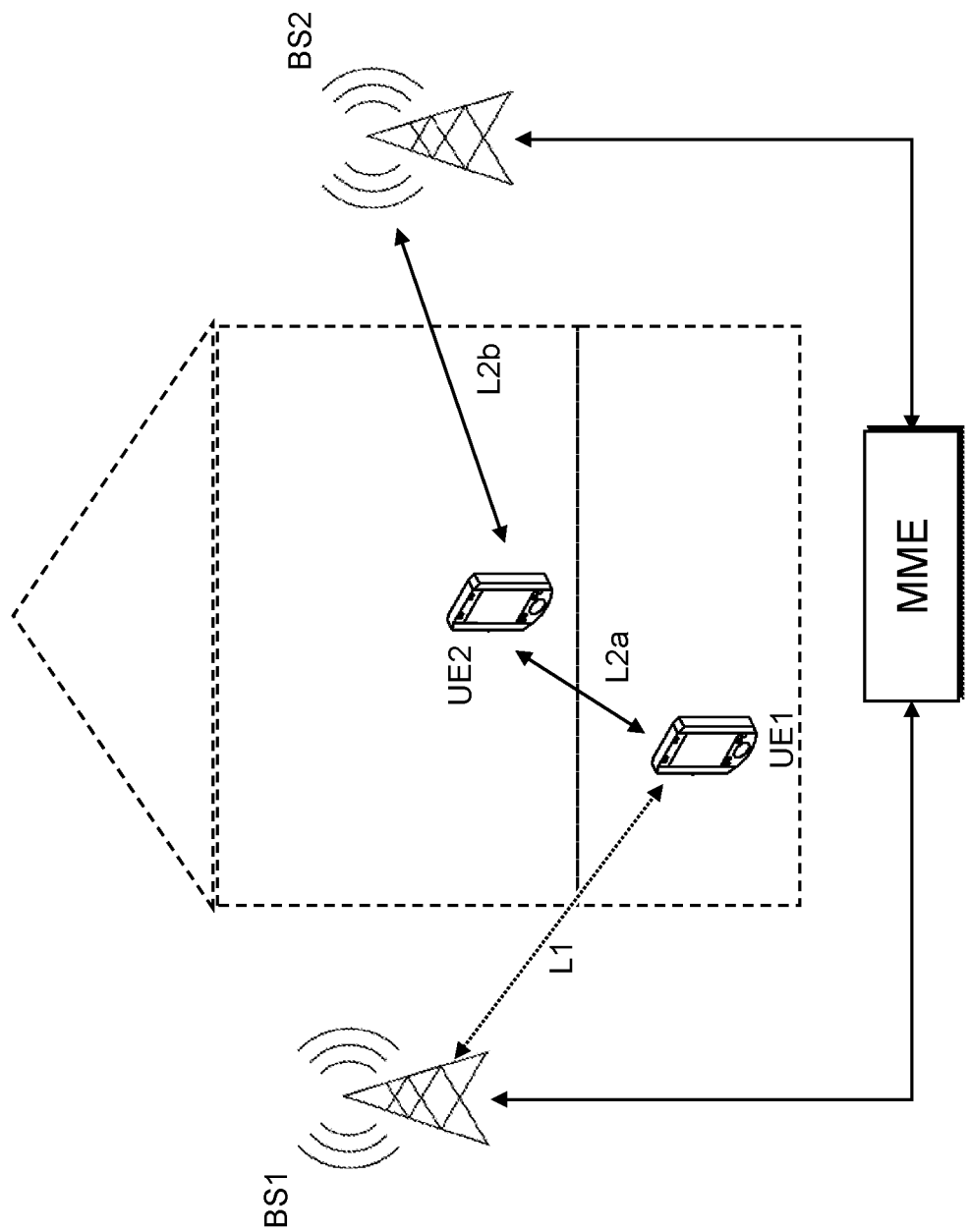
FIG. 4 shows another schematic situation of a wireless terminal and a base station according to preferred embodiment of the invention.

An alternative setup compared to above is shown in FIG. 4. Here the same wireless terminals UE1 and UE2 with the device-to-device communication link L2a is shown as before in FIG. 2.

The difference is, that wireless terminal UE1 is camping on a different base station BS1 than wireless terminal UE2, which camps on base station BS2. Both base stations are connected via cellular network components, in this case the MME.

The difference in terms of management is, that when wireless terminal UE1 sends the link quality message to its assigned base station BS1, then the base station BS1 cannot make measurements on the direct communication link L2b between wireless terminal UE2 and its assigned base station. Consequently the base station BS1 contacts with the received TMSI, and preferably also a received cell identifier, the MME and lets the base station BS2 carry out the measurement of the link quality of direct communication link L2b. When this measurement is received, then the decision which communication link is to take can be made, either at the MME or the base station BS2.

The same applies, when wireless terminal UE2 sends the link quality message to base station BS2, including the TMSI of wireless terminal UE1. Base station BS2 will then via the MME contact base station BS1 for making the link quality determination for communication link L1. As above, then all parameter are available for making the decision.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for a wireless terminal of communicating with a base station of a cellular network, the wireless terminal operating in enhanced coverage mode and configured to set up a communication session with the base station by means of at least one of a direct communication link and a sidelink communication link using a second wireless terminal, the method comprising the steps of:
   determining a quality of the direct communication link with the base station,
   determining a quality of a communication link to the second wireless terminal, the second wireless terminal being capable of communicating with the base station,
   initiating a transmission of a link quality message to the base station, the link quality message comprising information relating to said quality of at least one of said communication links,
   receiving a response message from the base station indicating that either the direct communication link or the sidelink communication link is to be used, and
   requesting for the communication session via the indicated communication link.

2. Method for a wireless terminal according to claim 1, wherein the quality of a communication link relates to at least one of
   enhanced coverage level,
   signal quality,
   power consumption,
   quality of service,
   jamming probability,
   access barring level.

3. Method for a wireless terminal of communicating with a base station according to claim 1,
   further comprising the step of receiving a session identifier from the base station and wherein the step of initiating said transmission comprises providing said session identifier for transmission with the link quality message.

4. Method according to claim 1,
wherein the second wireless terminal is operating on a different base station than the base station the first wireless terminal is operating on.

5. Method according to claim 1,
wherein in case the response message indicates that direct communication link and sidelink communication link are usable in parallel,
requesting for a communication session both of the direct communication link and the sidelink communication link.

6. Method according to claim 1,
wherein in case of the wireless terminal operating in a high mobility state the step of initiating a transmission comprises transmitting the link quality message to the second wireless terminal, and the step of receiving comprises receiving the response message from the second wireless terminal comprising an indication of the quality of the communication link between the second wireless terminal and the base station,
the method further comprising the step for the wireless terminal of determining which of the direct communication link or the sidelink communication link is to be used at least based on the determined and received qualities.

7. Wireless terminal for operating in a cellular network in enhanced coverage mode with a base station of the cellular network by means of at least one of a direct communication link and a sidelink communication link using a second wireless terminal, wherein,
for setting up a communication session, the wireless terminal is configured to:
determine a quality level of an enhanced coverage of the direct communication link with the base station,
determine a quality of a communication link to the second wireless terminal, the second wireless terminal being capable of communicating with the base station,
initiate a transmission of a link quality message to the base station, the link quality message comprising information relating to said quality of at least one of said communication links,
receive a response message from the base station indicating that either the direct communication link or the sidelink communication link is to be used,
request for a communication session via the indicated communication link.

8. Wireless terminal according to claim 7,
wherein the quality of the communication link relates to at least one of
enhanced coverage level,
signal quality,
power consumption,
quality of service,
jamming probability,
access barring level.

9. Wireless terminal according to claim 7,
wherein the wireless terminal is further configured to receive a session identifier from the base station, and to provide said session identifier for transmission with the link quality message.

10. Wireless terminal according to claim 7,
wherein in case the response message indicates that direct communication link and sidelink communication link are usable in parallel,
the wireless terminal is further configured to request for a communication session both of the direct communication link and the sidelink communication link.

11. Method for a base station of a cellular network for communicating with a wireless terminal, the method comprising, upon reception of a link quality message relating to the communication link between a first and a second wireless terminal, the steps of:
determining a quality of a communication link of the direct communication link to the first wireless terminal and the direct communication link to the second wireless terminal,
receiving a quality of the communication link between the first and second wireless terminal according to a sidelink communication link
comparing the determined quality of the communication link of the direct communication link to the first wireless terminal with the quality of the communication link of the direct communication link to the second wireless terminal, which includes considering the received quality of the communication link relating to the communication link between the first and second wireless terminal according to a sidelink communication link,
sending a response message indicating the direct or sidelink communication link to the first wireless terminal depending on the result of the comparing step.

12. Method according to claim 11,
wherein the comparison of communication link is made based on a comparison of at least one of:
coverage enhancement level,
power situation of the first wireless terminal,
overall network resource consumption,
quality of service requirement,
type of requested service.

13. Method according to claim 11,
wherein when the link quality message includes a session identifier, the step of comparing comprises contacting another cellular network component with the session identifier, wherein the cellular network component provides an indication relating to the quality of the communication link of the direct communication link to the first wireless terminal.

14. Method according to claim 11,
wherein in case the base station provides multiple link capability, the response message indicates that direct and sidelink communication link are usable in parallel.

15. Base station of a cellular network for communicating with a wireless terminal, upon reception of a link quality message relating to the communication link between a first and a second wireless terminal, the base station being configured to:
determine the quality of the communication link of the direct communication link to the first wireless terminal and the direct communication link to the second wireless terminal,
receive a quality of the communication link between the first and second wireless terminal according to a sidelink communication link
compare the determined quality of the communication link of the direct communication link to the first wireless terminal with the quality of the communication link of the direct communication link to the second wireless terminal, which includes considering the received quality of the communication link relating to the communication link between the first and second wireless terminal according to a sidelink communication link, send a response message indicating the direct or sidelink communication link to the first wireless terminal depending on the result of the comparing step.

16. Base station according to claim 15, wherein when the signal quality message includes a session identifier, the base station is further configured to contact another cellular network component with the session identifier, wherein the cellular network component provides an indication relating to the quality of the communication link of the direct communication link to the first wireless terminal.

* * * * *